United States Patent [19]
Manning

[11] Patent Number: 5,676,031
[45] Date of Patent: Oct. 14, 1997

[54] APPARATUS FOR DETECTING STOCK

[75] Inventor: Tim Manning, Eldora, Iowa

[73] Assignee: Logan Clutch Corp., Cleveland, Ohio

[21] Appl. No.: 422,968

[22] Filed: Apr. 17, 1995

[51] Int. Cl.[6] .................. B23B 13/04; B23B 3/36; B23Q 16/00
[52] U.S. Cl. .................. 82/153; 82/155; 82/127; 409/218
[58] Field of Search ............... 82/153, 155, 148, 82/173, 120, 162, 163, 127; 408/13, 16, 241 S; 409/218; 279/156; 16/84; 92/5 R

[56] References Cited

U.S. PATENT DOCUMENTS

| | | | |
|---|---|---|---|
| 2,247,562 | 7/1941 | Santen | 82/148 |
| 3,720,123 | 3/1973 | Eichenfold | 82/153 |
| 3,722,334 | 3/1973 | Schubert | 82/153 |
| 5,033,339 | 7/1991 | Parker | 82/153 |

FOREIGN PATENT DOCUMENTS

| 0015642 | 1/1991 | Japan | 92/5 R |
|---|---|---|---|

*Primary Examiner*—M. Rachuba
*Assistant Examiner*—Kenneth J. Hansen
*Attorney, Agent, or Firm*—Michael C. Pophal; Ralph E. Jocke

[57] ABSTRACT

An apparatus for detecting stock includes a stock forming machine (10), a stock feeder which feeds stock into the stock forming machine, and a stock detector (32). The stock detector includes a housing (34), which includes a bore (42). The housing further includes a face (50) adjacent said bore. The stock detector further includes a piston (54), which is slidably mounted in the bore, and which is moved in the bore by the stock. The bore further includes a fluid filled chamber (74), which is located between the piston and the face. The pressure of the fluid within the chamber is increased when the piston is moved by the stock towards the face, and this increase in pressure in the chamber causes the piston to decelerate. The stock detector further includes a sensor (88) which is positioned in the housing adjacent the bore, for detecting the movement of the piston. When the stock moves the piston towards the face, the movement of the stock is stopped when the piston engages the face, and the sensor detects the movement of the piston.

16 Claims, 4 Drawing Sheets

APPARATUS FOR DETECTING STOCK

TECHNICAL FIELD

This invention relates to multi-spindle stock forming machines, particularly to stock detecting apparatuses for such machines.

BACKGROUND ART

Generally multi-spindle stock forming machines include a stock stop device, which acts to halt the advance of stock fed through a spindle by a stock feeder mechanism. These devices typically comprise a fixed bolt placed so that the stock is stopped at a desired distance from the forward edge of the spindle. These prior art devices absorb the full impact of the advancing stock, often causing the stock to be dented or otherwise damaged. These devices also suffer from the inability to detect when the stock has run out and has not been fed through the spindle.

Other prior art devices have included stock stop devices which decelerate the stock before fully halting its advance and also detect the stock stop action. These prior art devices typically comprise a stock engaging member, a pneumatic chamber, a pressure source, and a pressure sensor. The pneumatic chamber is initially charged by the pressure source. When the stock contacts the stock engaging member the member is driven back compressing the pneumatic chamber. The increase in the pressure in the chamber acts to decelerate the stock, and is detected by the pressure sensor. These prior art devices are unreliable because of variations in the pressure source. Variations in the initial uncompressed pressure may result in false signals being sent by the detector if the pressure is too high. Low pressure variations may result in pneumatic pressures which are too low to be detected by the pressure sensor when the device is engaged by the advancing stock.

Thus there exists a need in the prior art for an apparatus for detecting stock which reliably detects when stock is advanced in a multi-spindle stock forming machine.

DISCLOSURE OF THE INVENTION

An object of the present invention is to provide an apparatus for detecting stock which reliably detects when stock is advanced by a stock feeder in a multi-spindle stock forming machine.

A further object of the present invention is to provide an apparatus for detecting stock which is not dependant on a constant pressure fluid charge.

A further object of the present invention is to provide an apparatus for detecting stock which decelerates stock in a manner that prevents it from being damaged when it is stopped.

A further object of the present invention is to provide an apparatus for detecting stock in which the decelerating force can be varied.

A further object of the present invention is to provide an apparatus for detecting stock in which the stock detection sensitivity can be varied.

Further objects of the present invention will be made apparent from the following Best Modes for Carrying Out Invention and the appended claims.

The foregoing objects are accomplished in the preferred embodiment of the invention by an apparatus for detecting stock which includes a stock forming machine, a stock feeder, and a stock detector. The stock forming machine is of the multi-spindle type, with the spindles positioned in a drum that is rotatable about a central shaft. The stock is fed into the back of the spindles by a stock feeder, which can be either incorporated into the stock forming machine or operate separately therefrom. The stock feeder advances the stock through the spindle until it engages the stock detector, where the stock is stopped. The stock is held in the spindle by collets which are positioned on the front of the spindles. Once the stock is fed into the spindle and clamped in the collet, the drum is indexed from the stock feeding position to sequential stock working positions. At these stock working positions, the stock is machined by tools in cross slides, main tool slides and thread slides. The portion of the stock which can be machined by these tools is defined by the distance between the stock detector and the collet at the stock feed position. This portion of stock is cut from the stock at the last stock working position, and the drum is indexed so that a new portion of stock can be fed through the spindle.

At each of the positions within the stock forming machine, sensors are located to indicate that the tasks to be performed have been completed on the stock at that position. These sensors feed a signal to a controller of the stock forming machine. The signal from the sensor at the stock feed position can be used by the controller as an indication that the stock has been fed and is ready to be worked on. The controller can also operate the stock feeder and send a signal to the stock feeder to feed stock. If the signal from the sensor at the stock feed position is not sent to the controller a set time period after the controller initiated the stock feed operation, the controller can interpret this as indication of stock feeder malfunction, or that the stock has run out. The controller then indicates to the operator an appropriate error message and shuts down operation of the machine.

The stock detector includes a housing with a longitudinal bore extending therethrough. The housing further includes a face extending traverse to the longitudinal axis and adjacent to the bore. The bore of the housing is stepped and the diameter of the front bore surface is larger than that of the back surface diameter. The face extends between the front and back surfaces.

An annularly shaped piston is mounted within the bore for sliding movement in a front and back direction, along a longitudinal axis. The piston has a snap ring on its back end which engages the back end of the housing when the piston is in a front position in the bore. A shoulder of the piston engages the face of the housing when the piston is moved to a back position within the bore. A threaded piston bore extends longitudinally through the interior of the piston.

The stop includes a cylindrical stop arm, which is threaded and extends through the interior bore of the piston. The stop further includes a stop head which extends from a front end of the stop arm, for engagement with the advancing stock. The relative positions of the stop and the piston are set by screwing the stop in the piston bore to move it in either the forward or back direction.

The bore further includes a chamber which is fluid filled and positioned adjacent to the face of the housing and the shoulder of the piston. The chamber volume is at a maximum when the piston is in the front position within the bore. The chamber communicates with a pressurized fluid source via a port. The port extends through the housing and opens into the bore opposite the shoulder of the piston. The fluid pressure in the chamber acts upon the shoulder to move it toward the front position.

The stock detector further includes a sensor, which detects the movement of the piston within the bore to the back position. The sensor sends a detection signal to the controller when it senses this movement of the piston to the back position.

In operation the piston is biased toward the front position by the fluid pressure within the chamber and rests in the front position within the bore. When the stock is fed by the stock feeder through the spindle the stock engages the front face of the stop head and drives both the stop and the piston toward the back position. As the chamber volume is decreased by this movement the fluid pressure is increased causing the stock, stop and piston to decelerate until their movement is halted when the shoulder of the piston engages the face of the housing. The sensor detects the piston in the back position and sends the signal to the controller.

BRIEF DESCRIPTION OF DRAWINGS

A preferred embodiment of the invention, an apparatus for detecting stock is described hereunder in detail with a reference to the accompanying drawings.

BEST MODES FOR CARRYING OUT INVENTION

Figure 1:
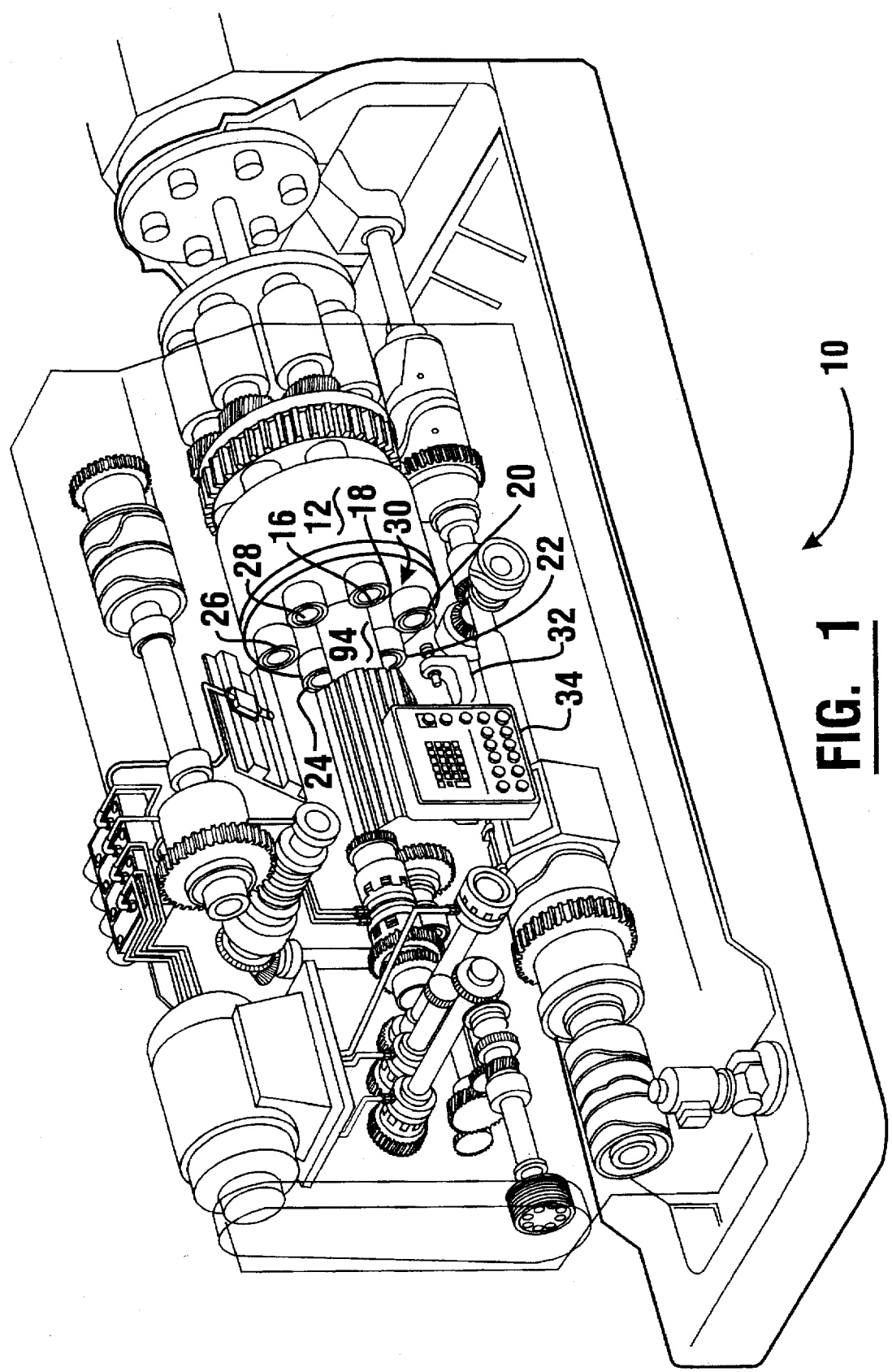
FIG. 1 is a perspective view of the apparatus for detecting stock of the present invention in combination with a multi-spindle stock forming machine and a stock feeder.

Referring now to the drawings and particularly to FIG. 1, the apparatus for detecting stock of the present invention is shown in combination with a stock forming machine 10. The stock forming machine 10 is more particularly described as an automatic multiple spindle machine. The stock forming machine 10 comprises a carrier or drum 12 which is indexable about the axis of a shaft 14. The drum 12 supports a plurality of parallel rotary spindles 16, of which six are depicted in the device shown in FIG. 1.

The spindles 16 are hollow so that each may accommodate a portion of a cylindrical bar or similar elongated stock. The stock may extend beyond the front and rear of the spindles 16. At the front of each spindle there is positioned a collet 18 for selectively holding and releasing the stock. The portion of stock extending in front of the spindles 16 and collets 18 is positioned to be machined by the stock forming machine 10. The stock held in the collet. 18 is rotatable while the dram is stationary. Through indexing of the drum a stock piece is transferred from an initial stock feeding position 20 to various working positions about the indexing dram.

At the various working positions, the stock can be sequentially worked on by cross slides, main tools slides and thread slides. These tools perform machining operations on the stock such as facing, boring, and threading while the spindle rotates the stock. The stock is fed into a spindle a the stock feed position 20, and is advanced through the working positions 22, 24, 26, 28 and 30. At position 30 the stock is cut, and the machined stock piece is removed from the machine. The spindle is then again indexed to the stock feed position 20, where a portion of stock to be formed is advanced through the spindle. Of course each spindle on the dram machines a stock piece simultaneously in the conventional manner.

A stock feeder, not shown, acts to advance stock into the back of the stock forming machine. The feeder advances the stock in response to receiving a signal from a controller on the stock forming machine. The feeder incrementally advances the stock through the hollow spindle 16 past the collet 18. The advance of the stock is halted when the stock engages the stock detector 32. The length of stock which can be worked on at the working positions is set by the distance between the collet 18 and the stock detector 32.

The rotation of the drum and the spindles, the operation of the feeder, and the operation of the tools at the working station are all regulated by a controller 34. Programs are entered into the memory of the controller which correspond to the parts to be produced. These programs contain the complete set of operations to be performed by the stock forming machine. The operations of controller 34 are more fully described in my co-pending application filed with the U.S. Patent Office as application Ser. No. 08/423,238 on Apr. 17, 1995, the disclosure of which is incorporated herein by reference.

As will be comprehensively described below, the stock detector signals the controller every time a piece of stock is stopped by the stock detector. The signal communicates that the operation taking place at the stock feed position 20 has been completed. Similar signals are sent by other detectors at other spindle positions. The controller can use the signal to stop the stock feeder from advancing stock, or for other purposes. If the stock detector fails to send a signal to the controller within a programmed time interval after the controller had sent a signal to the stock feeder to feed stock, the controller can interpret the lack of a signal as an indication that the stock is out or depleted. In response to sending this condition the controller operates to shut down the machine and to provide an indication of the problem on the display of the controller.

Figure 2:
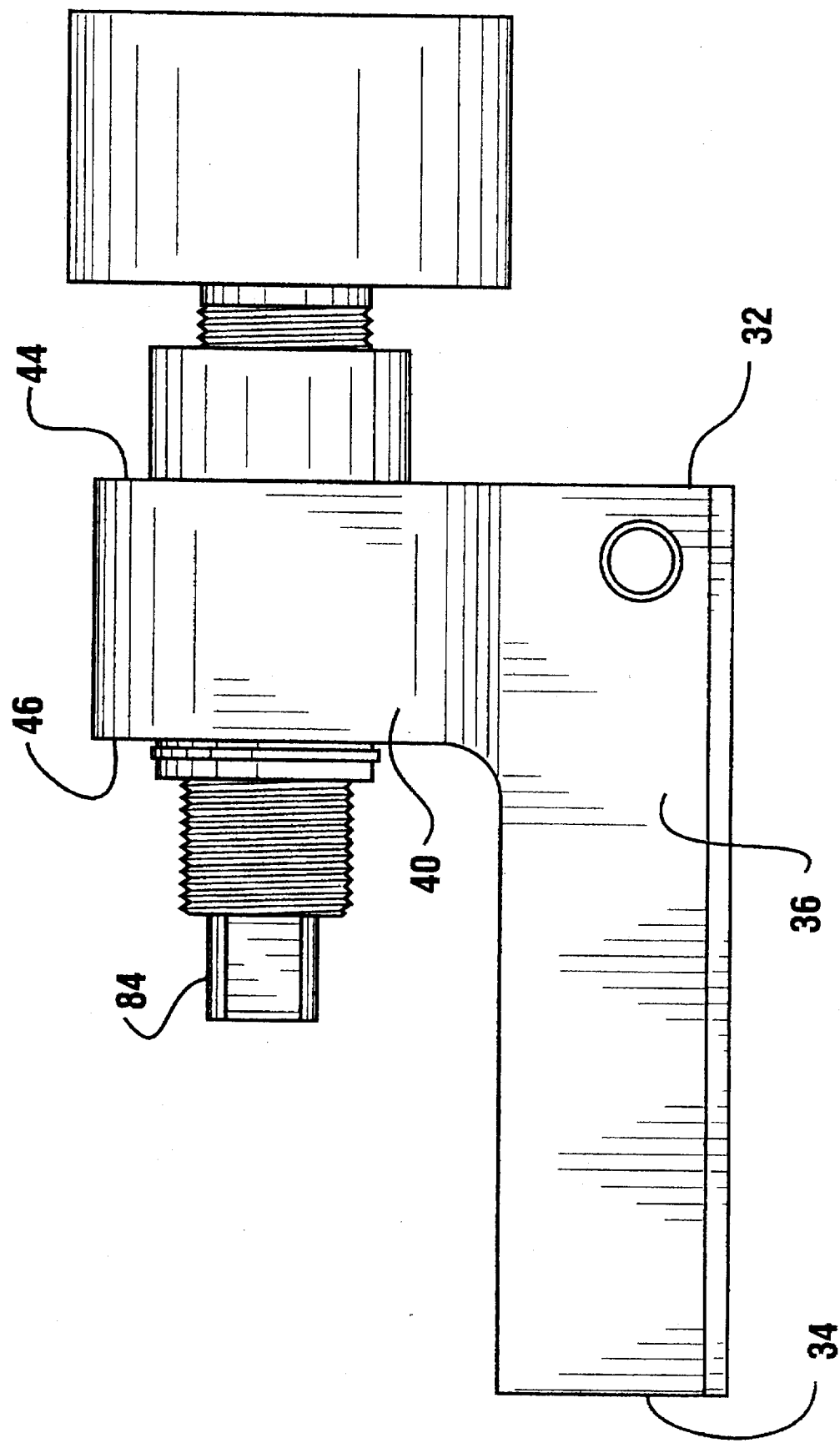
FIG. 2 is a side elevational view of the stock detector of the apparatus for detecting stock of the present invention.
Figure 3:
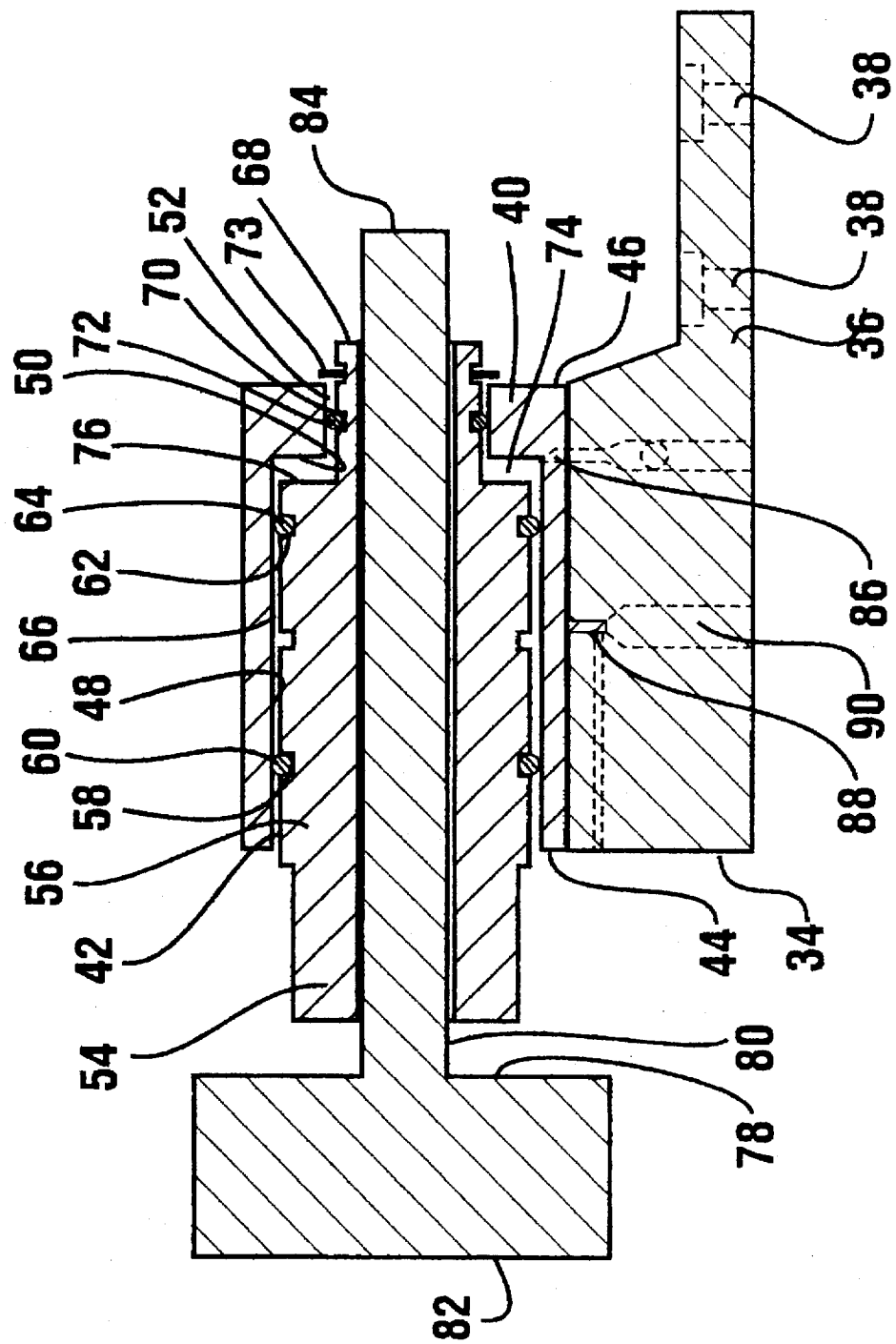
FIG. 3 is a cutaway schematic view of the stock detector of the apparatus for detecting stock of the present invention.

Referring now to both FIGS. 2 and 3. The exterior of the stock detector is depicted in FIG. 2. A cross section of the stock detector is shown schematically in FIG. 3. The stock detector 32 is connected to the stock forming machine 10 at housing 34. The housing 34 is generally L-shaped and has a base portion 36 which extends longitudinally and parallel to the stock and spindles. The base portion 36 has a plurality of apertures 38, through which fasteners extend to rigidly connect the housing to the stock forming machine. The housing 34 also includes a leg portion 40, which extends from the housing in a direction normal to the longitudinal direction of the base portion.

The leg portion 40 includes a bore 42, which extends through the leg portion in the longitudinal direction from the front 44 of the housing to the back 46 of the housing. The bore 42 is generally cylindrical and includes a step. The step divides the bore into a front portion and a back portion. The diameter of the back portion is smaller than the diameter of the front portion. The front portion of the bore is bounded by an annular front surface 48 which extends longitudinally, and a radially extending face 50 of a step which bounds the back of the front portion of the bore is The back portion of the bore is similarly bounded by an annular back surface 52 of the bore. These three surfaces of the housing are smooth to provide a low coefficient of sliding friction.

The stock detector 32 further includes a piston 54. The piston is generally cylindrical and sized to closely fit within the bore 42. The piston 54 comprises a first portion 56 which extends through the front portion of the bore 42. The first portion includes a first notch 58 which extends the circumference of the first portion 56. A resilient seal 60 is positioned in the first notch to provide a pressure retaining surface between the first portion of the piston and the back surface of the bore. The first portion of the piston further includes a second notch 62, which also extends circumferentially around the first portion and is longitudinally disposed from the first notch. The second notch also holds a second seal or O-ring 64 which like the first seal 60 is engageable with the front surface 48. The seals 60 and 64 bound in a first area 66. The first area extends annularly around said piston 54, between the surface 48 and the exterior surface of the first portion of the piston. The seals 60 and 64 prevent solids and low pressure fluid from passing between the piston and the surface 48. The seals generally act as fluid pressure retaining means but allow fluids to pass between the seal and the front surface when the fluid pressure is sufficient to overcome the sealing force of the resilient seals. Alternatively the fluid pressure retaining means can comprise closely fitted mating surfaces of the external surface of the piston and the surfaces of the housing adjacent the bore.

The piston 54 further comprises a second portion 68. The diameter of the second portion is smaller than the diameter of the first portion and is sized so that the exterior surface of the second portion mates with the back annular surface 52 of the bore. The second portion includes a first notch 70 which extends the circumference of the second portion. A resilient seal 72 such as an O-ring is positioned in the first notch to provide a pressure retaining seal between the exterior surface of the second portion of the piston and the back surface of the bore. The second portion of the piston extends outward from the bore past the back surface of the housing.

The forward motion of the piston is limited by a ring 73, which nests within a groove on the second portion to the piston. The ring 73 is preferably a conventional snap ring or other fastener which can-be affixed to the second portion after the piston is inserted into the bore during assembly. The ring 73 stops the forward movement of the piston within the housing by engaging the back face of the housing.

The seal 72 and the second seal 64 bound a chamber 74. The chamber is further bounded by the shoulder 76 or back surface of the first portion of the piston and the face 50 of the bore. The volume of the chamber is decreased to a minimum when the shoulder 76 engages face 50.

The stock detector 32 further includes a stop 78. The stop comprises a stop arm 80 which extends through a central threaded bore of the annular piston. The exterior surface of the stop arm is threaded to mate with the threaded interior surface of the central bore of the annular piston. The stop further comprises a stop head 82 which includes a flat stop surface at a front axial end of the stop arm. The stop surface of the stock head is preferably flat to accept the impact of the advancing stock, and to release the stock when the drum is indexed.

Figure 4:
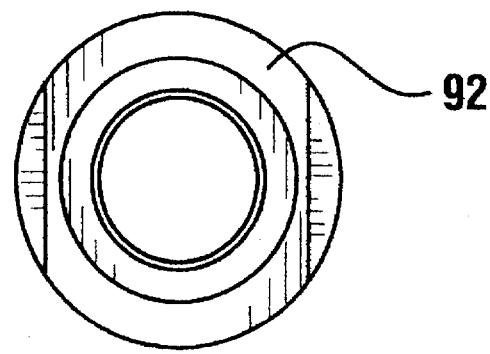
FIG. 4 is a front elevational view of the piston of the stock detector of the apparatus for detecting stock of the present invention. This view shows the wrench accepting shape of the piston.

The back axial end 84 of the stop arm 80 is formed into a hexagonal wrench pattern as shown in FIG. 2. As shown in FIG. 4 the surface of the front portion of the piston is formed with wrench flats so that it can be held by a wrench. The relative positions of the stop 78 and the piston 54 can be adjusted by the turning of either the stop or the piston with a wrench. Alternatively or additionally, set screws or a locking nut could be utilized to secure and adjust the relative positions of the stop and the piston.

Figure 5:
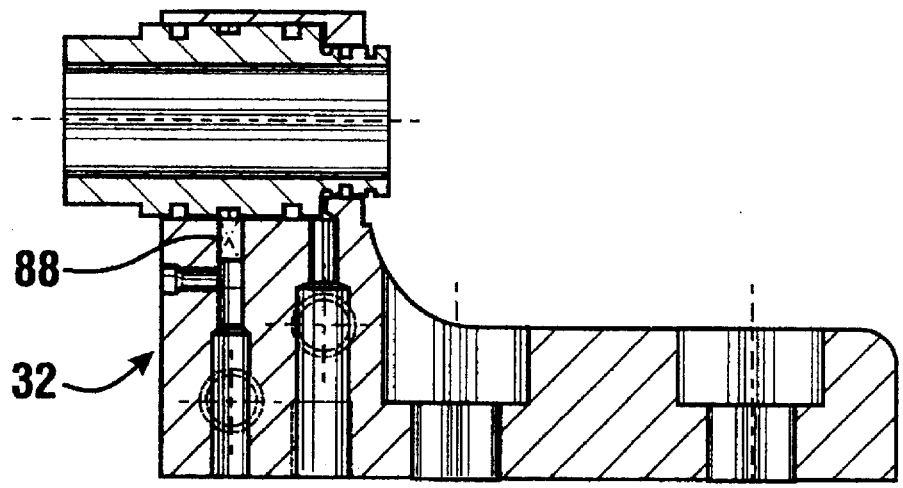
FIG. 5 and 6 are cross-section elevational views of the stock detector of the apparatus for detecting stock of the present invention. Only the housing and the piston are shown to illustrate the extent of movement of the piston within the bore of the housing.
Figure 6:
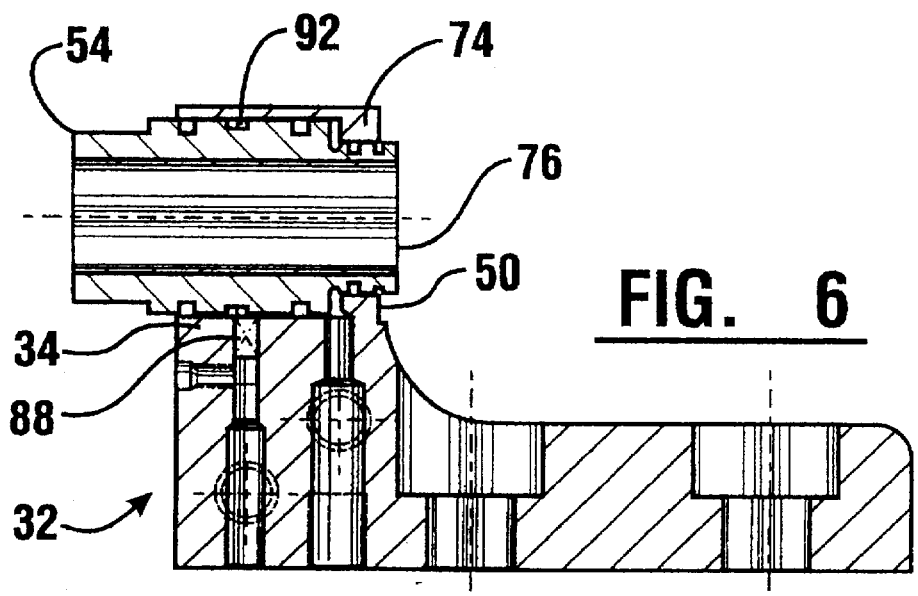

The housing 34 further includes a port 86. The port extends through the housing and is adapted 16 connect to a fluid source such as a compressed air line or other fluid line. The port terminates at the bore at the intersection of the face 50 and the front surface. The port allows the fluid source to communicate with the chamber 74. As best shown in FIGS. 5 and 6, the pressure of the fluid source is always exposed to a portion of the area of the shoulder 76 of the piston and therefore the fluid pressure can exert a forward force on the piston, even when the shoulder is abutting the face.

The chamber 74 acts to slow the speed of the backward travel of the piston when it is forced backward by a piece of stock striking the stop head 82. The force of the moving stock is transferred to the stop 78 and piston 54. The backward motion of the stop and piston acts to compress the fluid within the chamber. The decreasing volume of the chamber acts to increase the pressure of the fluid within the chamber, thus increasing the fluid force acting on the shoulder 76 of the piston, and the back facing surface of the, seal 64. As the shoulder nears the face 50 of the housing this forward directed reaction force reaches a maximum level. This rapidly increasing force acts to decelerate the backward movement of the stock, stop and piston until the piston bottoms by engagement of shoulder 76 with face 50. The initial pressure of the fluid within the chamber can be, varied, so as to vary the corresponding decelerating force.

The stock detector further includes a sensor element 88. The sensor element is positioned in the housing adjacent to the first area of the bore. The sensor element is located at the end of an access passage 90. The access passage is used for the insertion and maintenance of the sensor element. The access passage can also be used as a conduit for a signal line from the sensor to the controller. The sensor element preferably detects movement of the piston to the back position by sensing a groove 92 in the surface of the piston. The sensor element initially produces a signal indicative of the relatively small distance between the piston surface and the sensor. When the piston moves to the back position the groove is moved adjacent the sensor element, and the sensor element produces a signal indicative of the larger distance between the piston surface at the groove and the sensor. The sensor is preferably a proximity sensor such as a GS-36 3B made by XSUNX. The signal sent by the sensor is coupled with an amplifier and interface circuit card which sends a detection signal to the controller. By electronic adjustment of the amplifier the sensitivity of the stock detector can be varied.

The operation of the stock detector 32 can best be seen in FIGS. 5 and 6. In these Figures only the piston and the housing are shown. In FIG. 6, the stock detector is shown in a ready position. The fluid pressure has forced the piston into a forward position, expanding the chamber to its largest volume. The ring 73, not shown, has engaged the back face of the housing, thus limiting the forward movement of the piston. The groove 92 is partially forward of the sensor element 88.

When the stock is moved into the spindle and towards the stock detector 32 by the stock feeder, the end of the stock strikes the forward face of the stock head and transfers momentum to the stop and the piston. The stock, stop and piston continue in the back direction after the engagement. As the piston moves rearward, the volume of the chamber 74 is deceased, and the fluid pressure within the chamber and its resulting forward directed force is increased. This fluid pressure force acts to decelerate the stock, stop and piston, as the chamber volume is decreased. The stock, stop and piston are fully decelerated as the shoulder 76 of the piston engages the face 50 of the housing. The fluid within the chamber is compressed as the chamber volume is decreased. If the seals bounding the chamber yield to the building pressure within the chamber, the fluid leaks from the chamber past the seals. The evacuated fluid is forced out of the bore between the external surface of the piston and the surface of the housing adjacent the bore. This fluid acts to sweep any accumulated dirt or grime out of the bore and the reliability of the device.

When the piston is moved in the backward direction, the groove 92 is moved adjacent the sensor element. The sensor detects the groove and sends a signal through the circuit card to the controller. The signal is recognized by the controller as indicative, of a proper stock feed event.

While the stock remains in the stock feed position 20, the piston remains in the rearward position shown in FIG. 5 while the stock rests against the forward face of the stop head. The fluid pressure continues to act on the area of the shoulder adjacent the port 86, and the back face of the seal 64, but this fluid force is not sufficient to expand the chamber. This is due to the small area of the piston that is exposed to the pressure force due to the configuration of the pressure opening to chamber 74. As the drum is indexed and the stock is moved within its spindle to the stock working position 22, the back directed force on the stop and piston is released. The fluid pressure force then quickly acts to expand the chamber and move the piston to its forward and ready position.

Thus the invention achieves the above stated objectives, eliminates difficulties encountered in the use of prior devices, solves problems and attains the desirable results described herein.

In the foregoing description, certain terms have been used for brevity, clarity and understanding. However, no unnecessary limitations can be implied therefrom because such terms are used for descriptive purposes and are intended to be broadly construed. Moreover, the description and illustrations given are by way of examples and the invention is not limited to the exact details shown or described.

Having described the features, discoveries and principles of the invention, the manner in which it is constructed, and the advantages and useful results obtained; the new and useful structures, devices, elements, arrangements, parts, combinations, systems, equipment, operations and relationships are set forth in the appended claims.

I claim:

1. An apparatus comprising:
   a stock forming machine;
   a stock feeder wherein said stock feeder feeds stock into said stock forming machine;
   a stock detector, including:
   a housing, said housing including a bore, and wherein said housing includes a radially extending first surface;
   a piston movably mounted in said housing, wherein said piston is engageable with said first surface responsive to movement of said piston in said housing;
   a sensor adjacent said bore in said housing;
   wherein stock fed by said feeder is operative to move said piston, and wherein said sensor senses when said piston engages said first surface.

2. The apparatus according to claim 1 wherein said housing further includes a fluid filled chamber in said bore, said chamber bounded by said piston, wherein upon movement of said piston in response to said stock said chamber is reduced in volume.

3. The apparatus according to claim 1 wherein said piston comprises an outer annular surface positioned within said bore, and wherein said outer annular surface includes a recess, and wherein said sensor detects proximity of said recess to said sensor.

4. The apparatus according to claim 1 wherein said detector further comprises a stop arm extending from said piston, said arm including a stop head, and wherein said stock moves said piston by engagement with said stop head.

5. The apparatus according to claim 5 wherein said piston includes a longitudinally extending internal bore and wherein said stop arm includes a portion extending in said bore and selectively positionable therein.

6. An apparatus comprising:
   a stock forming machine;
   a stock feeder, wherein said stock feeder feeds stock into said stock forming machine;
   a stock detector, including:
   a housing, wherein said housing includes a radially extending surface;
   a piston, wherein said piston comprises a first portion, and wherein said piston is movably mounted in said housing and wherein said first portion is engageable with said first surface responsive to movement of said piston in said housing;
   a sensor positioned adjacent said first portion in said housing;
   wherein stock fed by said feeder is operative to move said piston, and wherein said sensor senses when said first portion engages said first surface.

7. The apparatus according to claim 6 wherein said housing further includes a chamber, and wherein said stock detector further comprises biasing means, wherein said biasing means is positioned within said chamber, and said biasing means is operative to bias said first portion away from said first surface.

8. The apparatus according to claim 7 wherein said stock detector further comprises a stop arm extending from said piston, said arm including a stop head, and wherein said stock moves said piston by engagement with said stop head.

9. The apparatus according to claim 8 wherein said piston includes an internal bore and wherein said stop arm includes a portion extending in said bore and wherein said stop arm is selectively positionable in said bore.

10. An apparatus comprising:
    a stock forming machine;
    a stock feeder, wherein said stock feeder feeds stock into said stock forming machine;
    a stock detector, including:
    a housing, said housing including a bore, wherein said bore comprises a stepped bore, wherein a first portion of said bore has a greater diameter than a second portion of said bore, and wherein said first and second portions are separated by a radially extending face surface;
    a piston movably mounted in said housing, and wherein said piston is a stepped piston having a first piston portion in said first bore portion and a second piston portion smaller in diameter that said first piston portion in said second bore portion, and wherein said first and second piston portions are separated by a radially extending shoulder;
    a sensor adjacent said bore in said housing;

wherein stock fed by said feeder is operative to move said piston and wherein movement of said piston responsive to said stock is limited by engagement of said shoulder with said face surface, and wherein said sensor senses movement of said piston.

11. The apparatus according to claim 10 wherein said bore further comprises a fluid port adjacent said face surface, said fluid port being partially blocked by said piston when said shoulder is engaged with said face surface.

12. The apparatus according to claim 11 wherein a resilient annular seal extends between said piston and said bore on each longitudinal side of said port, and wherein said seals bound a chamber filled with pressurized fluid.

13. The apparatus according to claim 11 wherein said second piston portion extends outward from said housing, and further comprising an attached member attached to said second piston portion externally of said housing, and wherein said attaching member is sized to prevent entry into said bore.

14. The apparatus according to claim 10 wherein said first piston portion has an annular surface portion, and wherein said annular surface portion includes a recess, and wherein said sensor is responsive to proximity of said recess thereto.

15. The apparatus according to claim 14 wherein a resilient annular seal extends between said piston and said bore on each longitudinal side of said recess.

16. The apparatus according to claim 15 wherein said recess includes an annular groove in the annular surface portion of said piston.

* * * * *